Sept. 16, 1924.                    1,508,428
H. G. WAGNER
ELECTRIC STORAGE BATTERY CELL AND CASE
Filed July 13, 1922

UNITED STATES PATENT OFFICE.

HUGO G. WAGNER, OF POINT PLEASANT BEACH, NEW JERSEY.

ELECTRIC-STORAGE-BATTERY CELL AND CASE.

Application filed July 13, 1922. Serial No. 574,606.

*To all whom it may concern:*

Be it known that I, HUGO G. WAGNER, a citizen of the United States, residing at Point Pleasant Beach, in the county of Ocean and State of New Jersey, have invented certain new and useful Improvements in Electric-Storage-Battery Cells and Cases, of which the following is a specification.

My invention relates to cells and cases for electric storage batteries and the object of the invention is to provide a case having one or more cells of a novel construction especially designed for use with interlocking grids of the general type disclosed in my copending application for improvement in grids for electric storage batteries, Serial No. 574,605 filed July 13, 1922.

This object, and other advantageous ends which will be described hereinafter, I attain in the following manner, reference being had to the accompanying drawings in which—

Figure 2:
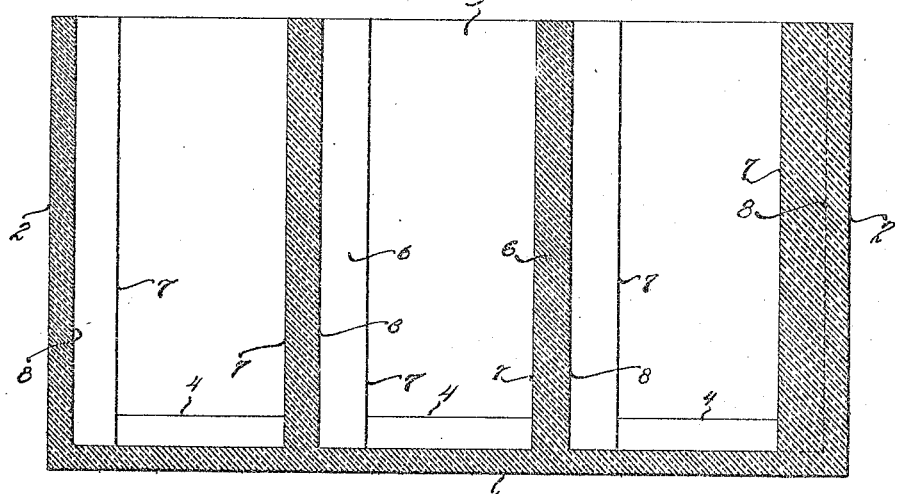
Figure 2 is a vertical longitudinal section of the case with the grids omitted.
Figure 1:
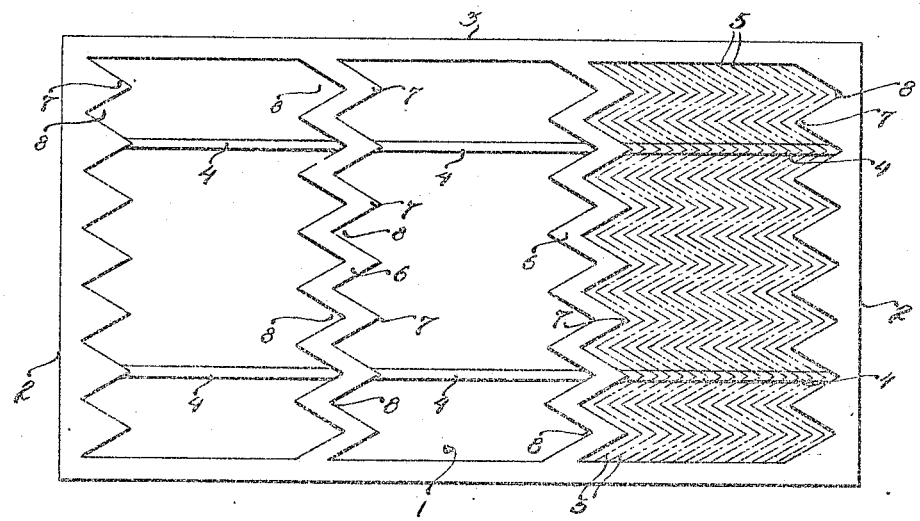
Figure 1 is a top plan view of a battery case embodying my invention.

The numeral 1 represents the bottom of the case, 2 the end walls, 3 the side walls, 4 the ribs which support the grids, 5 interlocking positive and negative grids and 6 the partitions to form cells. The end walls are formed with inwardly and vertically extending serrations 7 and corresponding depressions 8, the serrations preferably being sharp. The partitions are formed with serrations 7 and opposite depressions 8 corresponding in contour with those in the end walls, the serrations in the partitions being in alignment with the depressions in the adjacent end wall and the adjacent partition, and the depressions in alignment with the serrations in the adjacent end wall and the adjacent partition.

The case is designed for use with grids formed with opposite vertically extending serrations and depressions corresponding in contour with and adapted to closely fit over the serrations in the end walls and partitions and over each other.

Inasmuch as electricity travels to points this arrangement offers less resistance and gives quicker action.

Interlocking the grids with case parts insures them against sliding relatively to each other and when properly packed vibratory motion is precluded.

I have illustrated my invention in connection with a three cell case but it is equally applicable to one cell or any number of cells.

While I have described my invention as taking a particular form it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A battery cell having opposed walls provided with inwardly extending angular projections and corresponding depressions adapted to interlock with correspondingly shaped grids.

2. A battery case having opposed walls provided with inwardly extending projections and corresponding depressions adapted to interlock with correspondingly shaped grids, the projections from each wall being aligned with the depressions in the other wall.

In testimony whereof I have signed my name to this specification in the presence of two subscribing witnesses.

HUGO G. WAGNER.

Witnesses:
GEORGE B. PARKINSON
WILLIAM J. DOONER